United States Patent
Michot (10) Patent No.: US 9,639,944 B2
(45) Date of Patent: May 2, 2017

(54) METHOD AND APPARATUS FOR DETERMINING A DEPTH OF A TARGET OBJECT

(71) Applicant: TELEFONAKTIEBOLAGET L M ERICSSON (PUBL), Stockholm (SE)

(72) Inventor: Julien Michot, Sundbyberg (SE)

(73) Assignee: TELEFONAKTIEBOLAGET LM ERICSSON (publ), Stockholm (SE)

(*) Notice: Subject to any disclaimer, the term of this patent is extended or adjusted under 35 U.S.C. 154(b) by 10 days.

(21) Appl. No.: 14/432,341

(22) PCT Filed: Oct. 1, 2012

(86) PCT No.: PCT/EP2012/069352
§ 371 (c)(1),
(2) Date: Mar. 30, 2015

(87) PCT Pub. No.: WO2014/053157
PCT Pub. Date: Apr. 10, 2014

(65) Prior Publication Data
US 2015/0279042 A1    Oct. 1, 2015

(51) Int. Cl.
*G06T 7/00* (2006.01)
*G06T 5/00* (2006.01)

(52) U.S. Cl.
CPC .......... *G06T 7/0059* (2013.01); *G06T 5/005* (2013.01); *G06T 7/0061* (2013.01); *G06T 2207/10028* (2013.01)

(58) Field of Classification Search
CPC .... G06T 7/0059; G06T 7/0061; G06T 7/0085
USPC .......................................................... 382/154
See application file for complete search history.

(56) References Cited

U.S. PATENT DOCUMENTS

| | | | |
|---|---|---|---|
| 8,666,146 B1* | 3/2014 | Smolic | G06T 3/0093 348/42 |
| 2011/0115886 A1 | 5/2011 | Nguyen et al. | |
| 2012/0309520 A1* | 12/2012 | Evertt | G06T 19/20 463/31 |
| 2013/0088491 A1* | 4/2013 | Hobbs | G06T 13/80 345/423 |

(Continued)

OTHER PUBLICATIONS

Miao et al. "Texture assisted Kinect depth inpainting", 2012 IEEE.*
(Continued)

*Primary Examiner* — Siamak Harandi
*Assistant Examiner* — Shaghayegh Azima
(74) *Attorney, Agent, or Firm* — Rothwell, Figg, Ernst & Manbeck, P.C.

(57) ABSTRACT

A method for determining a depth of a target object in an environment is disclosed. The method comprises sensing a depth of objects within the environment with a depth sensing apparatus (1 10), identifying a disocclusion gap caused by the target object (120), detecting a position of edge contours of the disocclusion gap (1 30), and calculating a depth of the target object from the position of the disocclusion gap edge contours and a position of the depth sensing apparatus (140). Also disclosed are a computer program product for carrying out a method for determining a depth of a target object in an environment and an apparatus (300) for determining a depth of a target object in an environment.

20 Claims, 6 Drawing Sheets

(56) References Cited

U.S. PATENT DOCUMENTS

| | | | | |
|---|---|---|---|---|
| 2013/0278719 A1* | 10/2013 | Rusert | ............... | G06T 15/10 348/43 |
| 2014/0146134 A1* | 5/2014 | Tu | ............... | H04N 13/0048 348/43 |
| 2014/0168362 A1* | 6/2014 | Hannuksela | ....... | H04N 13/0048 348/43 |
| 2015/0117777 A1* | 4/2015 | Hsun | ............... | G06T 7/0051 382/173 |

OTHER PUBLICATIONS

Massimo Camplani et al. Efficient Spatio-temporal hole filling strategy for Kinect depth Maps, Proc. SPIE 8290, Feb. 2012, 11 pages.

Ke Xu et al. RGB-D Fusion Toward Accurate 3D Mapping, Proceedings of the 2011 IEEE International Conference on Robotics and Biomimetics, Dec. 2011, 5 pages.

Doria, et al., "Filling Large Holes in LiDAR Data by Inpainting Depth Gradients", Computer Vision and Pattern Recognition Workshops (CVPRW), 2012 IEEE Computer Society Conference, Jun. 16, 2012, pp. 65-72, XP032206779.

Miao, et al., "Texture-assisted Kinect Depth Inpainting", International Symposium Oncircuits and Systems (ISCAS), 2012 IEEE, May 20, 2012, pp. 604-607, XP009170520.

Xu, et al., "A foreground biased depth map refinement method for DIBR view synthesis", 2012 IEEE International Conference on Acoustics, Speech and Signal Processing (ICASSP 2012), Kyoto, Japan, Mar. 25-30, 2012; [Proceedings], IEEE, Piscataway, NJ, Mar. 25, 2012, pp. 805-808, XP032227249.

* cited by examiner

METHOD AND APPARATUS FOR DETERMINING A DEPTH OF A TARGET OBJECT

CROSS REFERENCE TO RELATED APPLICATION(S)

This application is a 35 U.S.C. §371 National Phase Entry Application from PCT/EP2012/069352, filed Oct. 1, 2012, the disclosure of which is incorporated by reference.

TECHNICAL FIELD

The present invention relates to a method and an apparatus for determining a depth of a target object in an environment. The invention also relates to a computer program product configured to implement a method for determining a depth of a target object in an environment.

BACKGROUND

Three dimensional video technology continues to grow in popularity, and 3D technology capabilities have evolved rapidly in recent years. Production studios are now developing a number of titles for 3D cinema release each year, and 3D enabled home cinema systems are widely available. Research in this sector continues to gain momentum, fuelled by the success of current 3D product offerings and supported by interest from industry, academia and consumers.

The term 3D is usually used to refer to a stereoscopic experience, in which an observer's eyes are provided with two slightly different images of a scene, which images are fused in the observer's brain to create an impression of depth. This effect is typically used in 3D films for cinema release and provides an excellent 3D experience to a stationary observer. However, stereoscopic technology is merely one technique for producing 3D video images. Free viewpoint television (FTV) is a new audiovisual system that allows observers to view 3D video content while freely changing position in front of a 3D video display. In contrast to stereoscopic technology, which requires the observer to remain stationary to experience the 3D content, FTV allows an observer to view a scene from many different angles, greatly enhancing the impression of being actually present within the scene.

The FTV functionality is enabled by capturing a scene using many different cameras which observe the scene from different angles or viewpoints. These cameras generate what is known as multiview video. Multiview video can be relatively efficiently encoded by exploiting both temporal and spatial similarities that exist in different views. However, even with multiview coding (MVC), the transmission cost for multiview video remains prohibitively high. To address this, current versions of FTV only actually transmit a subset of captured multiple views, typically between 2 and 3 of the available views. To compensate for the missing information, depth and disparity maps are used to recreate the missing data. From the multiview video and depth/disparity information, virtual views can be generated at any arbitrary viewing position. Many techniques exist in the literature to achieve this, depth image-based rendering (DIBR) being one of the most prominent.

A depth map, as used in FTV, is simply a greyscale image of a scene in which each pixel indicates the distance between the corresponding pixel in a video object and the capturing camera. A disparity map is an intensity image conveying the apparent shift of a pixel which results from moving from one viewpoint to another. The link between depth and disparity can be appreciated by considering that the closer an object is to a capturing camera, the greater will be the apparent positional shift resulting from a change in viewpoint. A key advantage of depth and disparity maps is that they contain large smooth surfaces of constant grey levels, making them comparatively easy to compress for transmission using current video coding technology.

Figure 1:
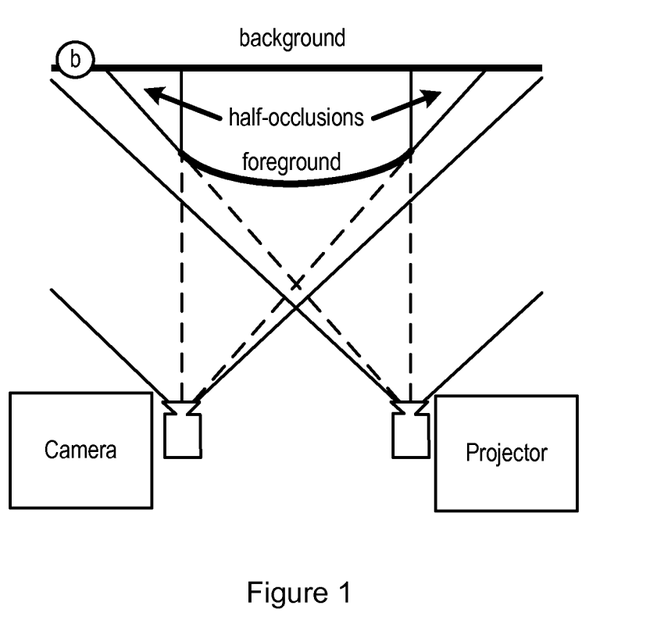
FIG. 1 illustrates an example of a disocclusion gap.

A depth map for a scene or environment may be compiled by measuring depth of objects within the environment using specialised cameras. Structured light and time of flight cameras are two examples of such specialised cameras which may be used to measure depth. In a structured light camera, a known pattern of pixels (often a grid or horizontal bars) is projected onto a scene. Deformation of the known light pattern on striking different objects is recorded and used to calculate depth information for the objects. In a time of flight camera, the round trip time of a projected pulse of light is recorded and used to calculate the required depth information. One drawback of such specialist cameras is that the range of depths that can be measured is limited. Objects that are too close or too far away from the device cannot be sensed, and hence will have no depth information. A further drawback is the generation of disocclusion gaps. The specific configuration of depth sensing devices generally requires the provision of a transmitting device (such as an IR projector) and a recording device (such as an IR camera) to be positioned at a distance from one another. This arrangement results in occlusions in the background of the sensed environment resulting from the presence of foreground objects. Only the foreground objects receive for example the projected light pattern, meaning that no depth information can be obtained for the background area that is obscured by the foreground object. These obscured regions of no depth information are known as disocclusion gaps. An example of a disocclusion gap for a structured light depth sensing device is illustrated in FIG. 1. The foreground object obscures the background, preventing a projected light pattern and or camera view from reaching the background over a limited area, and generating the shaded disocclusion gaps. One gap is created on the left of the object where projected light does not reach the background. A second gap is created on the right of the object where the camera is not able to view the background.

Figure 2A:
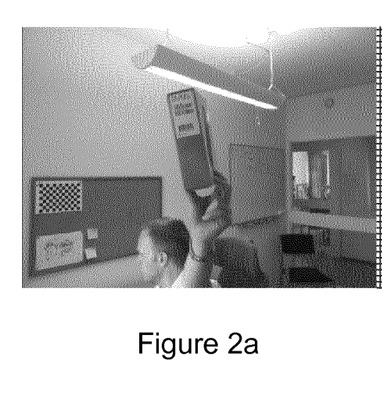
FIG. 2a shows image texture of a scene recorded with an image camera.
Figure 2B:
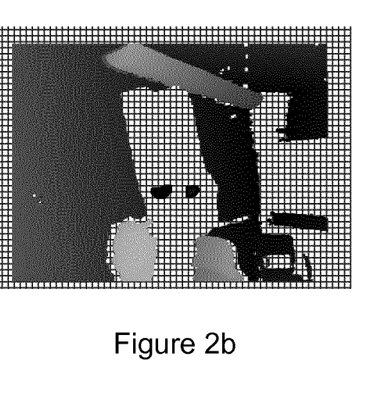
FIG. 2b shows a depth map of the scene of FIG. 2a recorded using a depth sensing apparatus.

Other issues such as non-reflective surfaces or different intrinsic camera parameters can also result in areas of a scene having missing depth values. FIG. 2a shows image texture of a scene recorded with an image camera. FIG. 2b shows a depth map of the same scene recorded using a depth sensing apparatus. The cross hatched area in the depth map indicates all the areas for which depth information could not be obtained as result of range limitations, disocclusion gaps or other constraints. It can be seen that a significant proportion of the scene has no available depth data.

A further limitation of depth sensing apparatus is accuracy. Not only is depth data unavailable for large areas of an environment, but those depth values that are available are often "noisy". Significant post processing may be required to filter and optimise the sensed depth values in order to improve their quality.

The limitations of depth sensing apparatus may result in a depth map of a scene that is both incomplete and inaccurate, and this can become a significant issue when using the map to generate 3D video images. If depth data for an object is unavailable or inaccurate then the 3D screen displaying the video content will not render the object correctly in three dimensions. This causes significant eye strain for the viewer and degrades the overall 3D experience. Object depth data needs to be both available and as accurate as possible in order to enable 3D video technology to provide a credible reflection of reality.

Existing attempts to address issues with the availability of depth data remain unsatisfactory. Filter and optimisation based frameworks use an iteratively optimised model of a scene and discard the missing depth areas. These methods do not attempt to fill in the missing depth data but merely filter the raw depth data temporally and spatially. Alternative options propose the use of one or more additional cameras together with a stereo-based depth estimation method in order to merge the measured and estimated depth maps. The integration of an additional camera or cameras significantly increases both the computational burden and the practical complexities of these methods.

SUMMARY

It is an aim of the present invention to provide a method, apparatus and computer program product which obviate or reduce at least one or more of the disadvantages mentioned above.

According to a first aspect of the present invention, there is provided a method for determining a depth of a target object in an environment. Embodiments of the method comprise sensing a depth of objects within the environment with a depth sensing apparatus, identifying a disocclusion gap caused by the target object, detecting a position of edge contours of the disocclusion gap, and calculating a depth of the target object from the position of the disocclusion gap edge contours and a position of the depth sensing apparatus.

Embodiments of the present invention thus determine a depth value for an object based on a disocclusion gap created by the object. A feature of sensed depth data for certain objects is used as a tool for calculating depth data which may otherwise be unavailable or inaccurate.

According to an embodiment of the invention, identifying a disocclusion gap caused by the target object may comprise identifying an area of the environment at least partially obscured from the depth sensing apparatus by the target object.

A depth sensing apparatus may comprise a projecting element and a recording element, which elements may not be positioned at the same location. The sensing of object depth values with such apparatus may require line of sight to the object from both the projecting element and the recording element. Obscuring of an area from either one of these elements of the depth sensing apparatus can result in inability to sense a depth value, and hence a disocclusion gap.

According to an embodiment of the invention, detecting a position of edge contours of the disocclusion gap may comprise identifying within a map of the sensed depth data a distant edge contour bounding an area of no depth data, identifying within the depth map a near edge contour substantially adjacent to the distant edge contour and having a corresponding profile, and detecting a position of the distant and near edge contours.

According to some embodiments of the invention, a certain amount of sensed depth data may be available for the target object. Such data may be noisy or otherwise inaccurate and it may therefore be desirable to calculate depth data for the object based on the disocclusion gap it creates. An object for which some depth data is available will appear in a map of the sensed depth data, and thus both near edge and distant edge contours of the disocclusion gap caused by the object may be identified within a map of the sensed depth data.

According to another embodiment of the invention, detecting a position of edge contours of the disocclusion gap may comprise identifying within a map of the sensed depth data a distant edge contour bounding an area of no depth data, identifying within a texture image of the environment a near edge contour substantially adjacent to the distant edge contour and having a corresponding profile, and detecting a position of the distant and near edge contours.

According to some embodiments of the invention, there may be no depth data available for the target object. This may be the case for example when the target object is outside the available depth sensing range. In some examples, the target object may be too close to the depth sensing apparatus to be registered. In such circumstances, it may not be possible to identify from a map of sensed depth data the transition from a target object disocclusion gap to the target object itself, the depth data in both regions being missing although for different reasons. According to an embodiment of the present invention, this missing edge contour of the disocclusion gap may be obtained from a texture image of the environment.

According to an embodiment of the invention, a position of at least one of the edge contours may include depth data. The at least one edge contour may comprise the distant edge contour. A distant edge contour of a disocclusion gap may, according to some embodiments, be identified within a map of sensed depth data as a transition between a region of the map where depth data is available and a region of the map where depth data is missing. Thus depth data for the distant edge contour may be available and according to embodiments of the invention, this depth data may be included within the detected position of the distant edge contour.

The depth sensing apparatus may comprise first and second elements located at first and second positions. According to another embodiment of the invention, calculating a depth of the target object may comprise calculating an intersection of a line linking the distant edge contour with the depth sensing element located furthest from the distant edge contour, and a line linking the near edge contour with the other depth sensing element.

Embodiments of the present invention may thus incorporate an assumption that a line of sight linking an obscured depth sensing element and the furthest edge of the disocclusion gap passes through a point of the target object. This assumption enables the point of the target object to be localised in the depth dimension using a relatively simple cross product calculation to find an intersection of two lines.

According to another embodiment, calculating a depth of the target object may comprise identifying a midpoint of a perpendicular line joining the two identified lines and having a minimum length. Embodiments of the invention may thus incorporate an assumption that a point of the target object is situated on the midpoint of such a line.

The depth sensing elements may comprise a transmitting element and a recording element, and may for example comprise a light emitting element and a camera of a structured light depth sensing apparatus. In alternative examples, the elements may comprise a pulse emitter and pulse receiver of a time of flight depth sensing apparatus.

According to an embodiment of the invention, the method may further comprise assigning the calculated depth value to the entirety of the target object. The depth of the object is thus approximated to be the depth calculated for a point of the object. This approximation allows for fast processing of the depth map.

According to another embodiment of the invention, the method may further comprise constructing a three dimensional model of the target object and assigning depth values to the object according to the calculated depth value and the three dimensional model. An accurate representation of the depth of the object may thus be obtained from only a single calculated depth value, using relative relations between points of the object encapsulated in the three dimensional model of the object.

According to an embodiment of the invention, the method may further comprise integrating the calculated depth value into a numerical framework for establishing a depth of the target object. The numerical framework may be a filtering framework or an optimization framework. The numerical framework may incorporate sensed values of a depth of the target object. In one example, the calculated depth may be incorporated as a relative constraint on the framework. In this manner, the method of the present invention may facilitate the development of accurate depth information from inaccurate sensed depth data.

According to another aspect of the present invention, there is provided a computer program product configured, when run on a computer, to implement a method according to the first aspect of the present invention.

According to another aspect of the present invention, there is provided an apparatus for determining a depth of a target object in an environment. Embodiments of the apparatus comprise an identifying unit configured to identify a disocclusion gap caused by the target object in depth data obtained with a depth sensing apparatus; a detecting unit configured to detect a position of edge contours of the disocclusion gap; and a calculating unit configured to calculate a depth of the target object from the position of the disocclusion gap edge contours and a position of the depth sensing apparatus.

In an embodiment, the identifying unit may be configured to identify an area of the environment at least partially obscured from the depth sensing apparatus by the target object.

According to an embodiment, the detecting unit may be configured to detect edge contours within a map of sensed depth data.

According to another embodiment, the detecting unit may be configured to detect edge contours in a map of sensed depth data and in a texture image of the environment.

The depth sensing apparatus may comprise first and second elements located at first and second positions. According to another embodiment of the invention, the calculating unit may be configured to calculate an intersection of a line linking a distant edge contour with the depth sensing element located furthest from the distant edge contour, and a line linking a near edge contour with the other depth sensing element.

According to another embodiment, the apparatus may further comprise a processing unit configured to perform at least one of: (i) assigning the calculated depth value to the entirety of the target object, (ii) assigning depth values to the object according to the calculated depth value and a three dimensional model of the object; and (iii) integrating the calculated depth value into a numerical framework for establishing a depth of the target object.

The processing unit may be configured to construct a three dimensional model of the target object.

Features disclosed in connection with one aspect or embodiment of the present invention may be combined or incorporated in another aspect or embodiment of the present invention.

BRIEF DESCRIPTION OF THE DRAWINGS

For a better understanding of the present invention, and to show more clearly how it may be carried into effect, reference will now be made, by way of example, to the following drawings in which.

DETAILED DESCRIPTION

Figure 3:
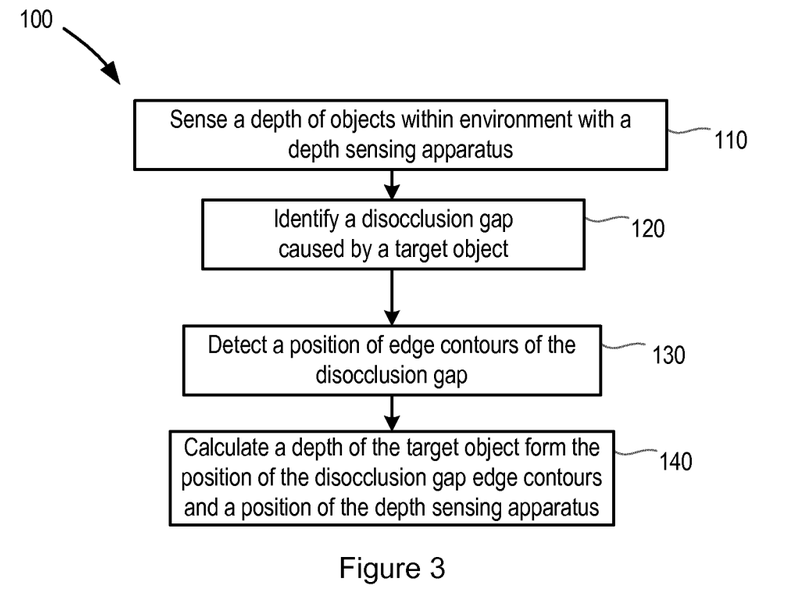
FIG. 3 is a flow chart illustrating steps in a method for determining a depth of a target object in an environment.

FIG. 3 illustrates steps in a method 100 for determining a depth of a target object in an environment. A first step 110 of the method comprises sensing a depth of objects within the environment with a depth sensing apparatus. The method then proceeds, at step 120, to identify a disocclusion gap caused by the target object. Having identified a disocclusion gap, the method proceeds, at step 130, to detect a position of edge contours of the disocclusion gap. Finally, at step 140 the method calculates a depth of the target object from the position of the disocclusion gap edge contours and a position of the depth sensing apparatus.

Figure 8:
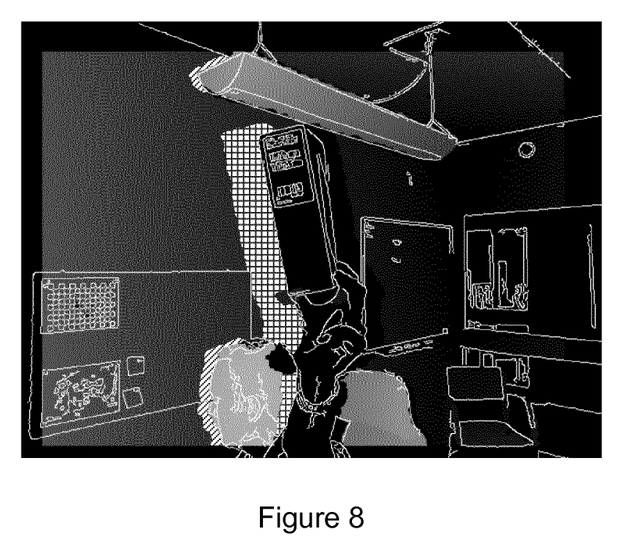
FIG. 8 illustrates identified disocclusion gaps in the scene of FIG. 2.

Embodiments of the present invention thus enable a depth value for a target object to be obtained from a position of a disocclusion gap caused by the object and a position of depth sending apparatus used to sense a depth of objects within the environment. As noted above, when using depth sensing apparatus to sense a depth of objects within an environment, certain objects can obscure parts of the environment, causing what are known as disocclusion gaps within a map of the sensed depth data. The present invention uses a relation between a location of such gaps and a location of an object causing the gaps to enable a depth value for an object causing a disocclusion gap to be determined. The relation between a disocclusion gap and a depth value of the object causing the gap can be appreciated qualitatively by considering FIG. 8. FIG. 8 illustrates a depth map of the scene of FIG. 2, with object edge boundaries identified from the associated image texture overlaid onto the sensed depth data. Three disocclusion gaps are highlighted by cross hatching in FIG. 8, caused by a head, a hand holding a box and an overhead light fitting. The disocclusion gap caused by the hand holding a box can be seen to be considerably larger than either the gap caused by the head or the gap caused by the overhead light fitting. The hand and box are much closer to the camera than the head or light fitting, and thus cause a larger disocclusion gap. The present invention exploits this relation to use information which may be obtained from disocclusion gaps to recreate unavailable or inaccurate depth information for objects causing the gaps.

In some embodiments, sensed depth data for the target object may be available, and the method 100 may provide a calculated depth value for use for example in an optimisation framework to improve the accuracy of available depth data for the object. In other examples, the target object may be out of an operating range of the depth sensing apparatus, and embodiments of the present invention may thus enable a depth to be calculated for an object which otherwise would have no available depth data.

Embodiments of the present invention may enable generation of a more complete and accurate depth map for an environment than can be obtained by depth sensing apparatus alone. In the context of 3D technology, such an improved depth map may facilitate better rendering of a scene in three dimensions, and hence a better 3D experience for a viewer.

Referring again to FIG. 3, and in accordance with an embodiment of the present invention, step 110 of the method may comprise using a structured light depth sensing apparatus or a time of flight depth sensing apparatus to sense a depth of objects within an environment. Such apparatus may permit the generation of a depth map for the environment, in which a greyscale image represents sensed depth values for objects within the environment. Sensed depth data for objects within the environment may be missing or inaccurate for various reasons, as discussed above. The present invention permits calculation of a depth value for a target object which may have no or inaccurate depth data.

At step 120 of the method 100, a disocclusion gap is identified which is caused by a target object. The position of the disocclusion gap with respect to the object will be dependent upon the location of the object and the particular arrangement and features of the depth sensing apparatus used to generate the available depth data. For example, a disocclusion gap may be generated to the left of a target object if the object blocks line of sight between a projector positioned to the right of the object and the background area. A disocclusion gap may appear in other positions with respect to the object causing it, depending upon the relative positions of the object and depth sensing apparatus, and the relative positioning of elements within the depth sensing apparatus.

At step 130 of the method 100, a position of edge contours of the identified disocclusion gap is detected. The edge contours of the disocclusion gap are the boundaries of the gap, and their position is used, together with positional information concerning the depth sensing apparatus, to determine a depth of the target object. According to embodiments of the invention, a distant edge contour of the gap is defined in a background of the environment as the line of transition between available sensed depth data and that region of the background where no sensed depth data is available owing to occlusion by the target object. A near edge contour of the disocclusion gap is defined by the target object itself. In the example scene illustrated in FIG. 2, a disocclusion gap caused by the box being held in the foreground in FIG. 2a can be seen in the depth map of FIG. 2b. However, in the scene shown in FIG. 2, the foreground box is not within the operational range of the depth sensing apparatus used to generate the depth map. The box is too close to the apparatus to permit sensing of a depth value. The box therefore also appears on the depth map as a region of no sensed depth data. The transition between the disocclusion gap caused by the box and the box itself cannot be seen on the depth map. Thus in the illustrated example, only the distant edge contour of the disocclusion gap can be seen in the depth map and image texture may be consulted to identify the near edge contour of the disocclusion gap. Techniques for identifying both the distant and near edge contours of a disocclusion gap are discussed in further detail below, with reference to FIGS. 5, 6, 7 and 8.

Figure 9:
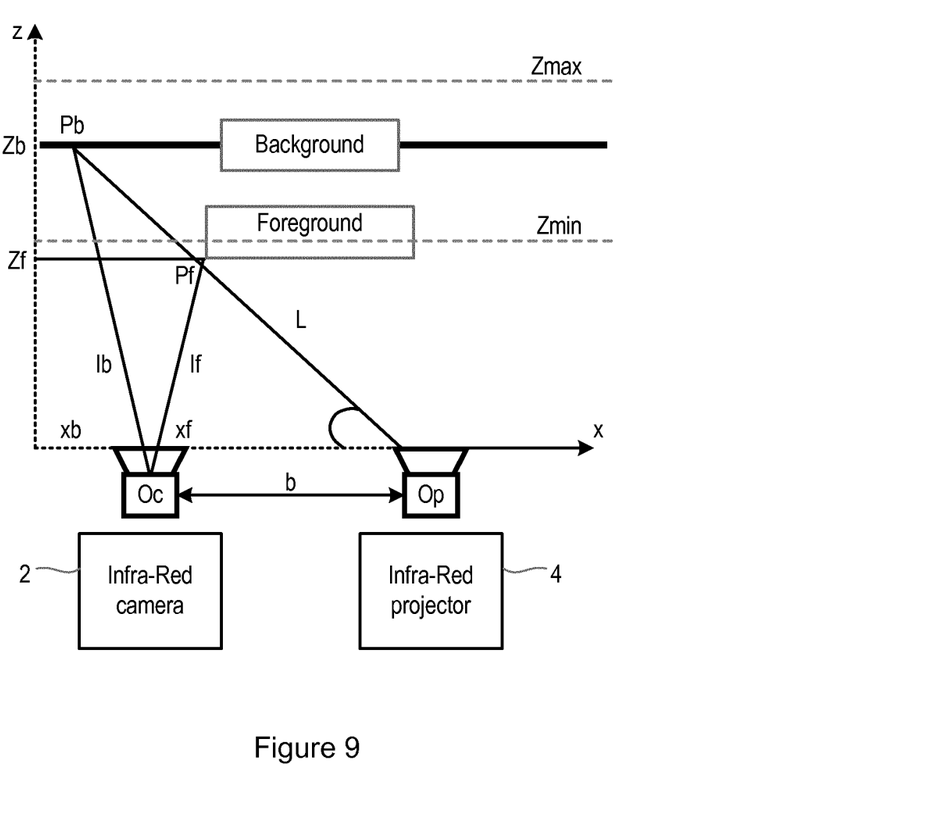
FIG. 9 illustrates an example of a calculation method.

Once a position of the edge contours of the disocclusion gap has been determined, the method proceeds, at step 140, to calculate a depth of the target object. A position of the depth sensing apparatus is also used in calculating the depth value. As discussed above, the position of the depth sensing apparatus has a bearing on where the disocclusion gap is positioned with respect to the target object, and this positional information thus helps to decipher the implication of the positioning of the disocclusion gap for the depth of the target object. Techniques for calculating a depth of the target object are discussed in further detail below, with respect to FIGS. 5, 7 and 9.

Figure 4:
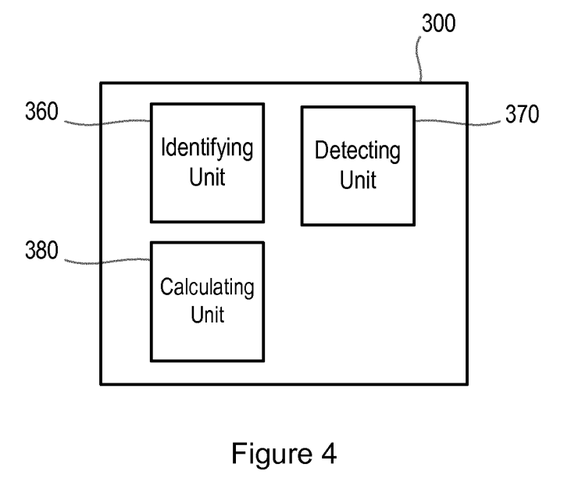
FIG. 4 shows an apparatus for determining a depth of a target object in an environment.

FIG. 4 illustrates functional units of an apparatus 300 in accordance with an embodiment of the invention. The apparatus 300 may execute the steps of the method 100, for example according to computer readable instructions received from a computer program.

With reference to FIG. 4, the apparatus 300 comprises an identifying unit 360, a detecting unit 370 and a calculating unit 380. It will be understood that the units of the apparatus are functional units, and may be realised in any appropriate combination of hardware and/or software.

The identifying unit 360 is configured to identify a disocclusion gap caused by a target object. The disocclusion gap may be identified within sensed depth data for an environment, obtained using a depth sensing apparatus. The detecting unit 370 of the apparatus 300 is configured to detect a position of edge contours of the disocclusion gap identified by the identifying unit 360. The calculating unit 370 is configured to calculate a depth of the target object from the position of the disocclusion gap edge contours detected by the detecting unit 370 and a position of the depth sensing apparatus.

Figure 5:
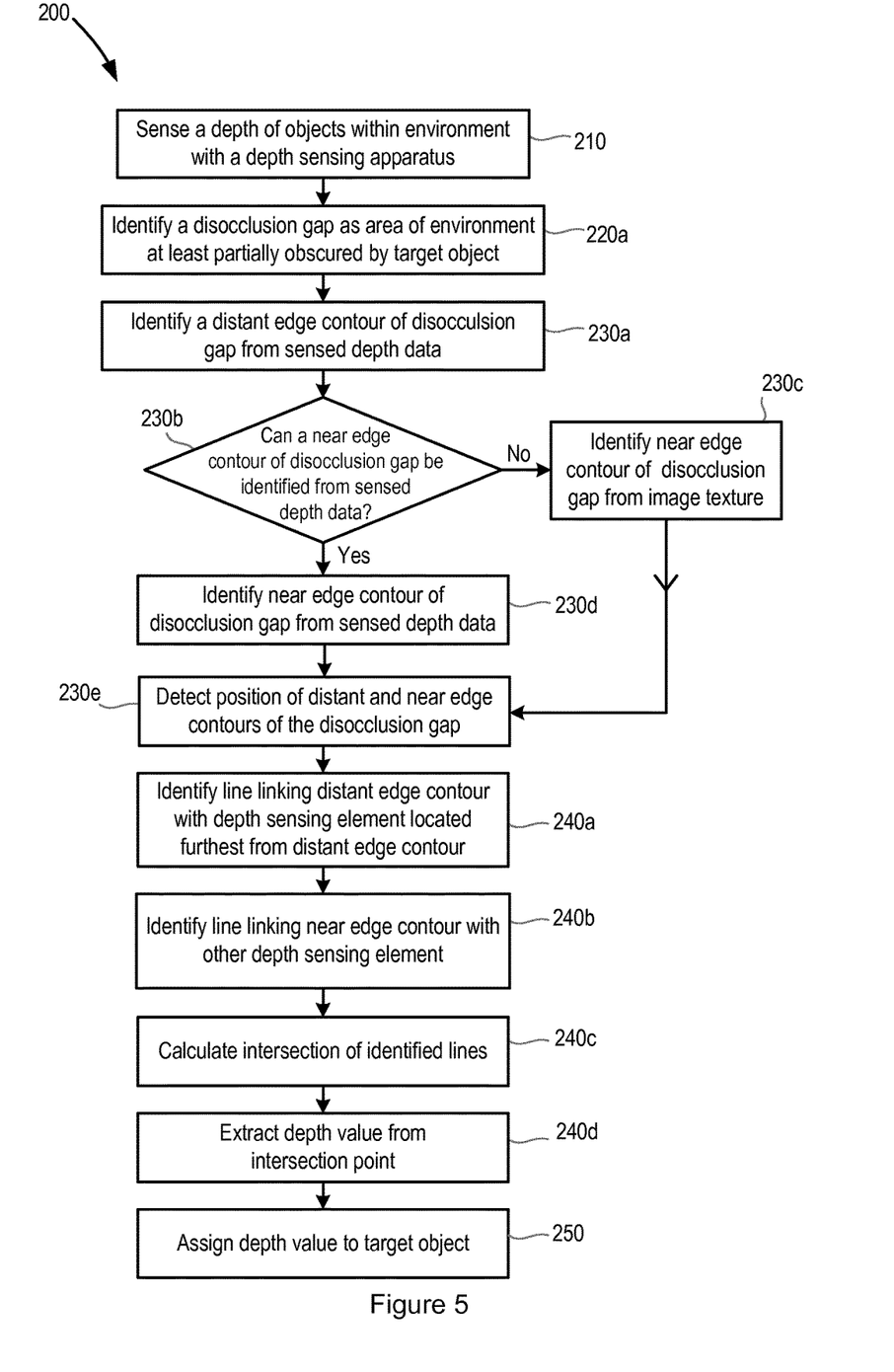
FIG. 5 is a flow chart illustrating steps in another embodiment of a method for determining a depth of a target object in an environment.

FIG. 5 illustrates steps in a method 200 for determining a depth of a target object in an environment in accordance with another embodiment of the present invention. The method 200 illustrates one example of how the steps of the method 100 may be further subdivided in order to realise the functionality discussed above. The method 200 also comprises additional steps which may be conducted in accordance with embodiments of the present invention.

Figure 7:
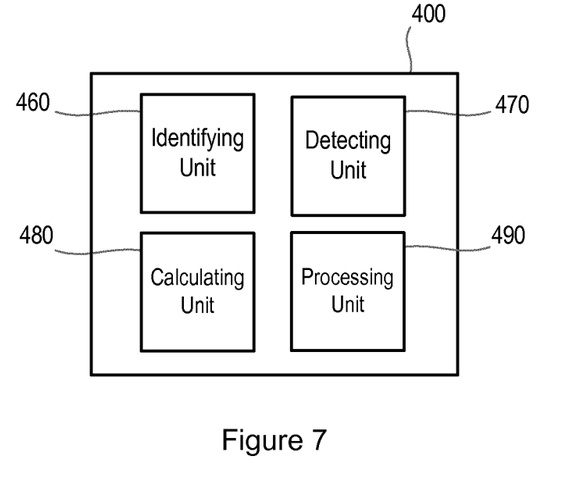
FIG. 7 shows another embodiment of apparatus for determining a depth of a target object in an environment.

FIG. 7 illustrates functional units of an apparatus 400 in accordance with another embodiment of the invention. The apparatus 400 may execute the steps of the method 200, for example according to computer readable instructions received from a computer program.

With reference to FIG. 7, the apparatus 400 comprises an identifying unit 460, a detecting unit 470 and a calculating unit 480. The identifying, detecting and calculating units 460, 470, 480 of the apparatus 400 substantially correspond to equivalent units of the apparatus 300. The apparatus 400 additionally comprises a processing unit 490. It will be understood that the units of the apparatus 400 are functional units, and may be realised in any appropriate combination of hardware and/or software.

The following disclosure discusses how the method 200 may be executed by the apparatus 400. However, it will be appreciated that the method 200 is not limited to being executed in this manner.

With reference to FIGS. 5 and 7, in a first step 210 of the method 200, a depth of objects within an environment under consideration is sensed with a depth sensing apparatus. In one example, the depth sensing apparatus may be a structured light depth sensing apparatus, comprising for example an IR projector and an IR camera arranged in horizontal alignment. Other examples of depth sensing apparatus and arrangement between depth sensing elements may be envisaged. The following discussion refers to a horizontally aligned structured light depth sensing apparatus for the purposes of explanation only.

After a depth of objects within an environment has been sensed, the identifying unit 460 of the apparatus 400 identifies at step 220a a disocclusion gap caused by a target object. The identifying unit is configured to identify the disocclusion gap as an area of the environment which is at least partially obscured by the target object and hence contains no sensed depth data. The target object may for example be any object within the environment which causes a disocclusion gap. The target object may be associated with sensed depth data, which may for example be considered to be noisy or inaccurate, or the target object may be out of range of the depth sensing apparatus, and hence have no sensed depth data associated with it. In another example, the target object may have inaccurate or no sensed depth data for other reasons, including a non-reflective object surface or particularities of the depth sensing apparatus employed.

Once the identifying unit 460 has identified a disocclusion gap caused by the target object, the detecting unit 470 detects at steps 230a to 230e a position of edge contours of the disocclusion gap. As discussed above, a disocclusion gap may comprise distant and near edge contours, which contours represent the boundaries of the disocclusion gap. The disocclusion gap edge contours may be discernable from the sensed depth data, depending upon the availability of sensed depth data for the target object itself. Alternatively, the disocclusion gap edge contours may be discernable from a combination of the sensed depth data and associated image texture data. FIG. 8 illustrates a depth map of the scene of FIG. 2, with object edge boundaries identified from the associated image texture overlaid onto the sensed depth data. Three disocclusion gaps can be identified in the depth map of FIG. 7, caused by a head, a hand holding a box and an overhead light fitting. The disocclusion gaps caused by the head and the light fitting can be clearly seen from the depth data alone. The head and light fitting have sensed depth values, indicated by their rendering in shades of grey in the depth map. The distant and near edge boundaries of the associated disocclusion gaps can therefore be detected as the transition between a region of available sensed depth data (rendered in shades of grey/black) and a region of no sensed depth data (cross hatched). In contrast, the hand holding the box, appearing in the foreground of the image, has no sensed depth data. Considering only the depth information, the hand and box are indistinguishable from the disocclusion gap they cause. It is therefore necessary to refer to the image text data to identify the near edge contour of the disocclusion gap caused by the hand/box. This near edge contour is the transition from disocclusion gap to object causing the gap and is therefore the edge contour of the hand/box as identified from the image texture edge data overlaid on the depth map.

In one embodiment of the present invention (not shown), the detecting unit 470 may be configured to follow a specific procedure according to the availability of depth data for the target object. For example, in one embodiment, the detecting unit 470 may be configured to follow a first procedure for target objects having available depth data, and to follow a second procedure for target objects having no available depth data. The first procedure may comprise (i) identifying in the sensed depth data edge contours bounding areas of no sensed depth data, and (ii) for each identified edge contour, checking adjacent identified edge contours to locate an adjacent edge contour having a corresponding profile. A corresponding profile may not be identical to the identified profile but will share profile features such as corners, protrusions etc. A detecting algorithm may progress from one edge of the scene to another. For example in the illustrated depth map of FIG. 8, a detecting algorithm may identify edge contours from the left of the image, and check for a neighbouring edge contour to the right of the identified edge contour which has a corresponding profile.

The second procedure may comprise (i) identifying in the sensed depth data edge contours bounding areas of no sensed depth data, and (ii) identifying object edges in image texture data. The procedure may then comprise (iii) identifying, for each identified edge contour in the sensed depth data, the object edge from the image texture data that has a corresponding profile. A detecting algorithm may again progress from one edge of the scene to another. For example in the illustrated depth map of FIG. 8, a detecting algorithm may identify sensed depth edge contours from the left of the image, and check for a neighbouring object edge contour to the right of the identified depth edge contour which has a corresponding profile.

In accordance with another embodiment of the present invention, and as illustrated in FIG. 5, the detecting unit 470 may be configured to follow a single procedure for all target objects. According to the embodiment illustrated in FIG. 5, in a step 230a, the detecting unit 470 identifies a distant edge contour of the disocclusion gap from the sensed depth data. As illustrated in FIG. 8, a distant edge contour of a disocclusion gap can be identified from the sensed depth data regardless of the availability of depth data for the target object, and does not appear in the image texture data. The detecting unit 470 then determines, at step 230b, whether or not a corresponding near edge contour for the disocclusion gap can be identified from the sensed depth data. If a near edge contour can be identified from the sensed depth data (Yes at step 230b) then the detecting unit 470 identifies the near edge contour from the sensed depth data at step 230d. As noted above, identifying an edge contour involves not just establishing that an edge exists, but determining the profile formed by the contour, so as to enable edge contours having corresponding profiles, and therefore defining distant and near edges of the same disocclusion gap, to be detected. If a corresponding near edge contour cannot be identified from the sensed depth data (No at step 230b) then the detecting unit 470 identifies the near edge contour of the disocclusion gap from the image texture of the environment. Suitable edge detection algorithms may be employed for identifying edge contours from the sensed depth data and the image texture. One example of a suitable algorithm is the Canny algorithm.

Figure 6:
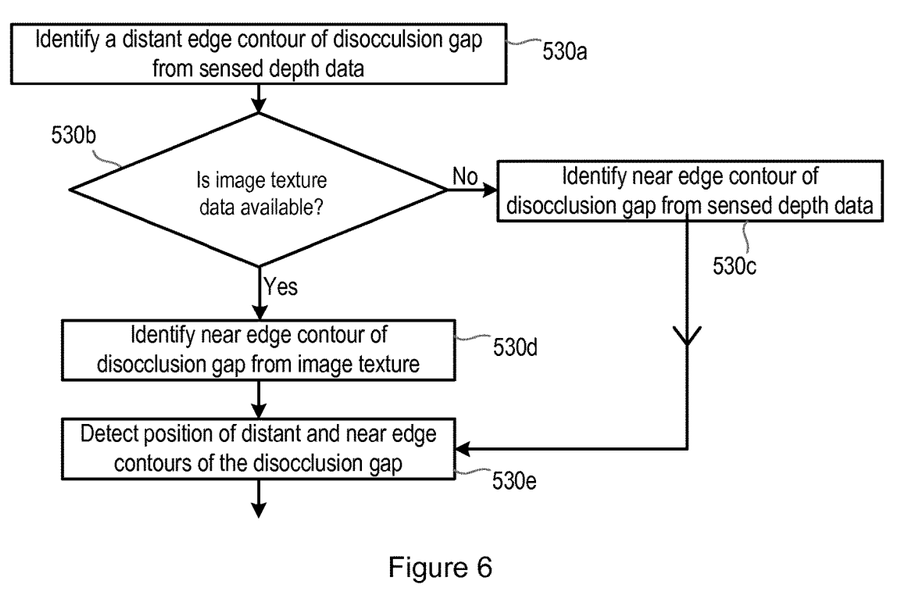
FIG. 6 is a partial flow chart illustrating alternative steps in the flow chart of FIG. 5.

Another alternative embodiment for edge contour detection is illustrated in FIG. 6. According to the embodiment illustrated in FIG. 6, a single procedure is again followed for all target objects, but the near edge contour is preferentially identified in image texture data, with reference to the sensed depth data only being made in the event that image texture data is not available. In certain circumstances, it may be that edge contours represented in an image texture of a scene may be more accurate that those represented in a depth map. It may therefore be appropriate to use image texture for identifying near edge contours of a disocclusion gap, even where such contours are also identifiable from sensed depth data. According to the embodiment of FIG. 6, after the identification of a disocclusion gap, the detecting unit 470 identifies, at step 530a a distant edge contour of the disocclusion gap from the sensed depth data. The detecting unit 470 then determines, at step 530b, whether or not image texture data is available. If image texture data is available (Yes at step 530b) then the detecting unit 470 identifies the near edge contour of the disocclusion gap from the image texture of the environment at step 530d. If image texture data is not available (No at step 530b) then the detecting unit 470 identifies the near edge contour from the sensed depth data at step 530c Referring again to FIG. 5, having identified the distant and near edge contours of the disocclusion gap either in the sensed depth data or in image texture data, the detecting unit 470 proceeds to detect the position of the distant and near edge contours at step 230e. Positional information for the distant edge contour may include depth or z axis information, as the distant edge contour is identified from sensed depth data. Positional information for the distant edge contour may also include x and/or y axis information, placing the contour within two or three dimensions. If elements of the depth sensing apparatus are horizontally aligned, then the positional information of the distant contour may include only x axis information. Alternatively, if the elements of the depth sensing apparatus are vertically aligned, then the positional information of the distant edge contour may include only y axis information. Positional information for the near edge contour may include only x and/or y axis information, according to alignment of the depth sensing elements. Positional information for the near edge contour may not include depth, or z axis information. A depth value for the near edge contour corresponds to a depth value for the target object itself. This depth value is calculated according to the present invention.

By knowing calibration parameters and extrinsic positional information of apparatus used to obtain the sensed depth data, a depth value for the near edge contour, and hence for the target object, can be calculated from the positional information of the disocclusion gap edge contours. Calibration parameters may include for example focal lengths and principal points. Positional information of the depth sensing apparatus may include a baseline distance between a projector and a camera of the apparatus, or, more generally, a relative pose [R, t] between the two elements.

FIG. 8 illustrates a scene configuration for an environment. FIG. 8 illustrates how, according to an embodiment of the present invention, a depth value for a target object may be calculated. The scene of FIG. 8 is viewed from above, with depth indicated on a vertically illustrated z axis. The target object (labelled foreground) is positioned between horizontally aligned elements of a depth sensing apparatus and a background of the scene. The depth sensing apparatus comprises an IR projector 2 and an IR camera 4. The optical centres $O_p$, $O_c$ of the projector and camera are positioned on the x axis and separated by a baseline distance b. Minimum and maximum operational distances for the depth sending apparatus are indicated as $Z_{min}$ and $Z_{max}$. The target object can be seen to be positioned at a depth $Z_f < Z_{min}$. The target object is therefore outside the operating range of the depth sensing apparatus and no depth data is available for the target object.

A disocclusion gap is caused by the target object, as the target object blocks a line of sight from the optical projector 2 to the background. $P_b$ $(X_b, Y_b, Z_b)$ is a point on the distant edge contour of the disocclusion gap. Point $P_b$ is positioned at a background depth $Z_b$. The x value $X_b$ of the point $P_b$ corresponds to the x position of the last sensed background image before occlusion by the target object. $P_f(X_f, Y_f, Z_f)$ is a point on the near edge contour of the disocclusion gap. $P_f$ is therefore a point on the target object. Point $P_f$ is positioned at a depth $Z_f$ which is to be calculated. The x value of the point $P_f$ corresponds to the first (line wise) observed projection of the target object in the image texture, moving towards the right in the image texture from the location of the distant edge contour identified in the sensed depth data. The points $P_b$ and $P_f$ are expressed in homogeneous coordinates, meaning that:

$$z*P = K^{-1}*p$$

where p(x,y) is the position of P in the image (in pixels), z is the depth value of P and K is the calibration matrix of the camera capturing the image.

A width W of the disocclusion gap can be calculated as:

$$W = X_f - X_b$$

A three dimensional line L can be drawn linking the point $P_b$ on the distant edge contour to the optical centre $O_p$ of the projector 2. The line L passes very close to the point $P_f$, as the line L represents the last available line of sight before occlusion starts at point $P_f$. The line L can be defined in homogeneous coordinates by the formula:

$$L = P_b - O_p$$

Another three dimensional line $l_f$ can be drawn linking the point $P_f$ on the near edge contour to the optical centre $O_c$ of the camera 4. The line $l_f$ can be defined in homogeneous coordinates by the formula:

$$l_f = P_f - O_c$$

It will be appreciated that in a more general form, the line L can be considered as linking the distant edge contour of the disocclusion gap with the element of the depth sensing apparatus that is furthest from the distant edge contour. The line $l_f$ links the near edge contour with the other depth sensing element.

The calculating unit 480 of the apparatus 400 identifies the line L linking the distant edge contour with the element of the depth sensing apparatus that is furthest from the distant edge contour at step 140a of the method. The calculating unit identifies the line $l_f$ linking the near edge contour with the other depth sensing element at step 140b of the method. The lines are identified according to the particular configuration of the scene and sensing apparatus in question.

Embodiments of the present invention use an assumption that the line L passes through the point $P_f$. As discussed above, the line L actually passes very close to the point $P_f$, but by making an assumption that the line L passes through the point $P_f$, a simple calculation can be used to identify the point $P_f$ in all thee dimensions. According to further embodiments, a more accurate approximation may be made for example by integrating the camera angular resolution into the approximation.

The approximation made to consider the line L as passing through the point $P_f$ means that both lines L and $l_f$ pass through the three dimensional point $P_f$. The depth value $Z_f$ of the point $P_f$ can therefore be found by identifying the intersection of the two lines L and $l_f$. This intersection can be found using a 3D lines cross product. As the depth sensing elements 2, 4 are aligned on the x axis, the intersection can also be considered in two dimensions, with no y values, and the intersection can be found by performing a 2D lines cross product:

$$P_f = l_f \times L$$

where $l_f$ and L are expressed in homogeneous coordinates and x represents the vector cross product.

According to the illustrated embodiment, the calculating unit 480 computes a cross product to identify the intersection of the lines L and $l_f$ at step 240c of the method.

According to another embodiment (not shown) the step 240c may be replaced by a step 241c. According to this embodiment, the assumption discussed above regarding the line L is replaced by an assumption that the point $P_f$ is situated in the middle of a perpendicular line joining $l_f$ and L and having a minimum length. Having identified the lines $l_f$ and L, the calculating unit 480 locates the middle of such a line and thus identifies the position of point $P_f$ at a step 241c.

Having identified the position of the point $P_f$, either by finding a lines intersection at step 240c or by finding a midpoint of a linking line at step 241c, the calculating unit 480 extracts the depth value $Z_f$ of the point $P_f$ at step 240d. The depth value $Z_f$ is the Z coordinate of the identified position $P_f$.

This extracted depth value represents the depth of a point on the target object with respect to the camera 4 optical centre. According to the illustrated embodiment, the processing unit 490 of the apparatus 400 may assign that depth value $Z_f$ to the entirety of the target object in a step 250.

According to another embodiment of the invention, the processing unit 490 may access a three dimensional model of the target object, and may assign the depth value $Z_f$ to the appropriate position on the 3D model of the target object according to the particular scene configuration. The processing unit 490 may then proceed to assign depth values to the different parts of the target object according to their position with respect to that part of the target object which is at the depth $Z_f$. The processing unit 490 may be configured to construct the 3D model of the object according to data provided for example from the image texture of the object.

According to another embodiment of the present invention, the method may have been employed to calculate a depth value for a target object for which sensed depth data is available. The sensed depth data may be approximate, noisy or otherwise inaccurate, and the processing unit 490 may be configured to integrate the calculated depth value into an optimisation or filtering framework in order to arrive at a more accurate depth value. The calculated depth value may for example be integrated as a relative constraint in a filtering or optimisation framework.

According to other embodiments of the present invention, the processing unit 490 may be configured to take appropriate action to assign depth values to the target object or to integrate a calculated depth value into a filtering or optimisation framework according to the availability of sensed depth data for the target object.

Embodiments of the present invention thus allow for generation of a more complete and/or more accurate depth map without the need for an additional camera. Embodiments of the present invention use depth and image texture information that is already available according to standard practices for measuring a depth map with a single depth sensing apparatus. The present invention facilitates the generation of depth data for objects having no available sensed depth data and also facilitates the generation of more accurate depth data for objects having inaccurate or noisy sensed depth data. The more complete and/or more accurate depth map which may be generated as a consequence of the present invention may be used in combination with three dimensional video technology to provide an improved 3D experience to a viewer.

The method of the present invention may be implemented in hardware, or as software modules running on one or more processors. The method may also be carried out according to the instructions of a computer program, and the present invention also provides a computer readable medium having stored thereon a program for carrying out any of the methods described herein. A computer program embodying the invention may be stored on a computer-readable medium, or it could, for example, be in the form of a signal such as a downloadable data signal provided from an Internet website, or it could be in any other form.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method for determining a depth of a target object in an environment, comprising:
   sensing a depth of objects within the environment with a depth sensing apparatus;
   identifying a disocclusion gap caused by the target object;
   detecting a position of edge contours of the disocclusion gap; and
   calculating a depth of the target object from the position of the disocclusion gap edge contours and a position of the depth sensing apparatus.

2. The method as claimed in claim 1, wherein identifying a disocclusion gap caused by the target object comprises identifying an area of the environment at least partially obscured from the depth sensing apparatus by the target object.

3. The method as claimed in claim 1, wherein detecting a position of edge contours of the disocclusion gap comprises:
   identifying, within a map of the sensed depth data, a distant edge contour bounding an area of no depth data;
   identifying within the depth map a near edge contour substantially adjacent to the distant edge contour and having a corresponding profile; and
   detecting a position of the distant and near edge contours.

4. The method as claimed in claim 1, wherein detecting a position of edge contours of the disocclusion gap comprises:
   identifying, within a map of the sensed depth data, a distant edge contour bounding an area of no depth data;
   identifying, within a texture image of the environment, a near edge contour substantially adjacent to the distant edge contour and having a corresponding profile; and
   detecting a position of the distant and near edge contours.

5. The method as claimed in claim 3, wherein a position of at least one of the edge contours includes depth data.

6. The method as claimed in claim 5, wherein the at least one edge contour comprises the distant edge contour.

7. The method as claimed in claim 1, wherein the depth sensing apparatus comprises first and second elements located at first and second positions, and wherein calculating a depth of the target object comprises calculating an intersection of a line linking a distant edge contour with the depth sensing element located furthest from the distant edge contour, and a line linking a near edge contour with the other depth sensing element.

8. The method as claimed in claim 1, wherein the method further comprises assigning the calculated depth value to the entirety of the target object.

9. The method as claimed in claim 1, wherein the method further comprises constructing a three dimensional model of the target object and assigning depth values to the object according to the calculated depth value and the three dimensional model.

10. The method as claimed in claim 1, wherein the method further comprises integrating the calculated depth value into a numerical framework for establishing a depth of the target object.

11. A computer program product comprising a non-transitory computer readable medium storing instructions for implementing the method of claim 1.

12. An apparatus for determining a depth of a target object in an environment, the apparatus comprising one or more processors and a non-transitory computer readable memory coupled to said one or more processors, said one or more processors configured to:
identify a disocclusion gap caused by the target object in depth data obtained with a depth sensing apparatus;
detect a position of edge contours of the disocclusion gap; and
calculate a depth of the target object from the position of the disocclusion gap edge contours and a position of the depth sensing apparatus.

13. The apparatus as claimed in claim 12, wherein the one or more processors are configured to detect edge contours within a map of sensed depth data.

14. The apparatus as claimed in claim 12, wherein the one or more processors are configured to detect edge contours in a map of sensed depth data and in a texture image of the environment.

15. The apparatus as claimed in claim 12, wherein the one or more processors are configured to perform at least one of:
assigning the calculated depth value to the entirety of the target object;
constructing a three dimensional model of the target object and assigning depth values to the object according to the determined depth value and the three dimensional model; and
integrating the determined depth value into a numerical framework for establishing a depth of the target object.

16. The apparatus as claimed in claim 12, wherein detect a position of edge contours of the disocclusion gap comprises:
identify, within a map of the sensed depth data, a distant edge contour bounding an area of no depth data;
identify within the depth map a near edge contour substantially adjacent to the distant edge contour and having a corresponding profile; and
detect a position of the distant and near edge contours.

17. The apparatus as claimed in claim 12, wherein detect a position of edge contours of the disocclusion gap comprises:
identify, within a map of the sensed depth data, a distant edge contour bounding an area of no depth data;
identify, within a texture image of the environment, a near edge contour substantially adjacent to the distant edge contour and having a corresponding profile; and
detect a position of the distant and near edge contours.

18. The apparatus as claimed in claim 17, wherein a position of at least one of the edge contours includes depth data.

19. The apparatus as claimed in claim 18, wherein the at least one edge contour comprises the distant edge contour.

20. The apparatus as claimed in claim 12, wherein the depth sensing apparatus comprises first and second elements located at first and second positions, and wherein calculate a depth of the target object comprises calculate an intersection of a line linking a distant edge contour with the depth sensing element located furthest from the distant edge contour, and a line linking a near edge contour with the other depth sensing element.

* * * * *